(12) United States Patent
Stone

(10) Patent No.: US 7,048,487 B2
(45) Date of Patent: May 23, 2006

(54) CONNECTOR

(75) Inventor: Roger Stone, Brighton (GB)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/606,315

(22) Filed: Jun. 25, 2003

(65) Prior Publication Data

US 2004/0265090 A1 Dec. 30, 2004

(51) Int. Cl.
*F16B 43/00* (2006.01)

(52) U.S. Cl. ...................................... 411/546; 411/166

(58) Field of Classification Search ................ 411/546, 411/535, 178, 432, 166
See application file for complete search history.

(56) References Cited

U.S. PATENT DOCUMENTS

| 4,078,276 A | 3/1978 | Nunes ........................ 16/130 |
| 4,518,276 A | 5/1985 | Mitchell et al. .............. 403/13 |
| 4,682,906 A | 7/1987 | Ruckert et al. .......... 403/409.1 |
| 4,846,614 A | 7/1989 | Steinbock .................. 411/307 |
| 4,881,316 A | 11/1989 | Wing ......................... 29/510 |
| 5,288,191 A * | 2/1994 | Ruckert et al. ............. 411/432 |
| 6,062,791 A * | 5/2000 | Simon ........................ 411/535 |
| 6,179,538 B1 | 1/2001 | Palm ......................... 411/399 |
| 6,357,953 B1 | 3/2002 | Ballantyne ................... 403/43 |
| 6,431,602 B1 * | 8/2002 | Ralko et al. ................ 280/781 |
| 6,585,447 B1 * | 7/2003 | Schwarzbich ............ 403/374.3 |
| 6,688,830 B1 * | 2/2004 | Kluting ....................... 411/546 |
| 6,776,566 B1 * | 8/2004 | Kobusch et al. ............ 411/546 |
| 6,779,957 B1 * | 8/2004 | Ozawa et al. ............... 411/384 |
| 6,789,993 B1 * | 9/2004 | Ozawa et al. ............... 411/546 |

FOREIGN PATENT DOCUMENTS

| CH | 353647 | 4/1961 |
| DE | 41 10 664 C1 | 6/1992 |
| EP | 0 023 404 A1 | 4/1981 |

* cited by examiner

*Primary Examiner*—Flemming Saether
(74) *Attorney, Agent, or Firm*—J. A. Thurnau, Esq.; C. H. Castleman, Esq.; J. L. Mahurin, Esq.

(57) ABSTRACT

A connector comprising an adapter having a threaded bore and a bushing having an external thread and an internal thread. The adapter has a stop on an outer surface to prevent rotation. The bushing is threaded into the adapter bore. A bolt is threaded into a bushing bore using the internal threads. As the bolt is turned the internal threads cause an interference fit between the bolt shank and the threads, temporarily preventing further insertion of the bolt. The bolt is then turned further causing the bushing to unscrew from the adapter toward the mounting surface until the bushing bears upon the mounting surface. The adapter engages with part thereby completely compensating for a gap between the part and a mounting surface. The adapter does not turn through engagement of the stop with an immoveable part. As the bolt is turned further, the sacrificial internal threads are stripped to allow the bolt to be fully torqued into a mounting surface hole.

11 Claims, 7 Drawing Sheets

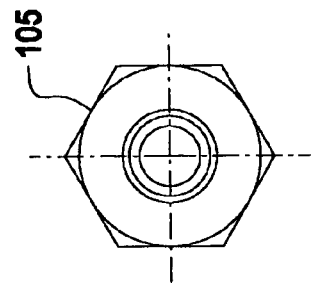
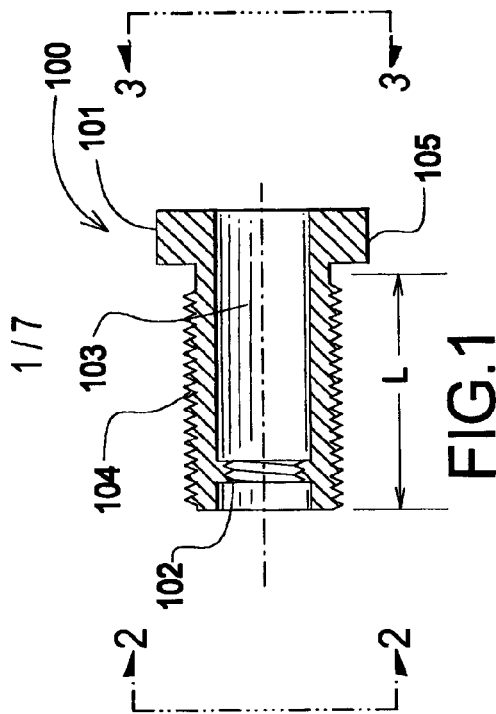
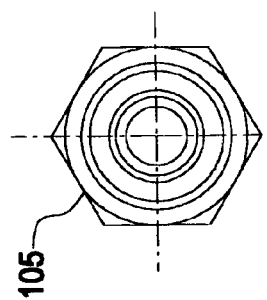
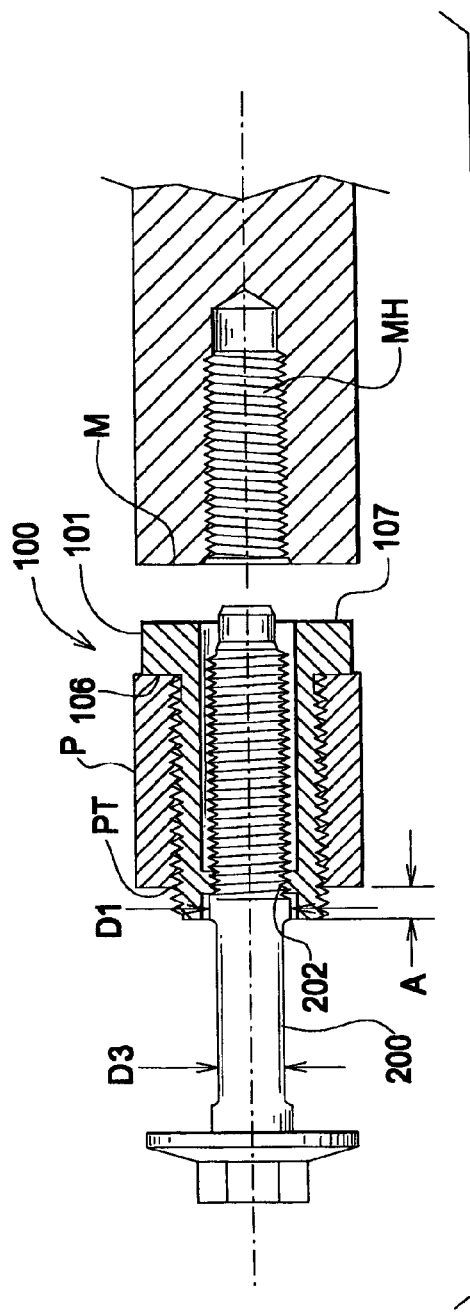

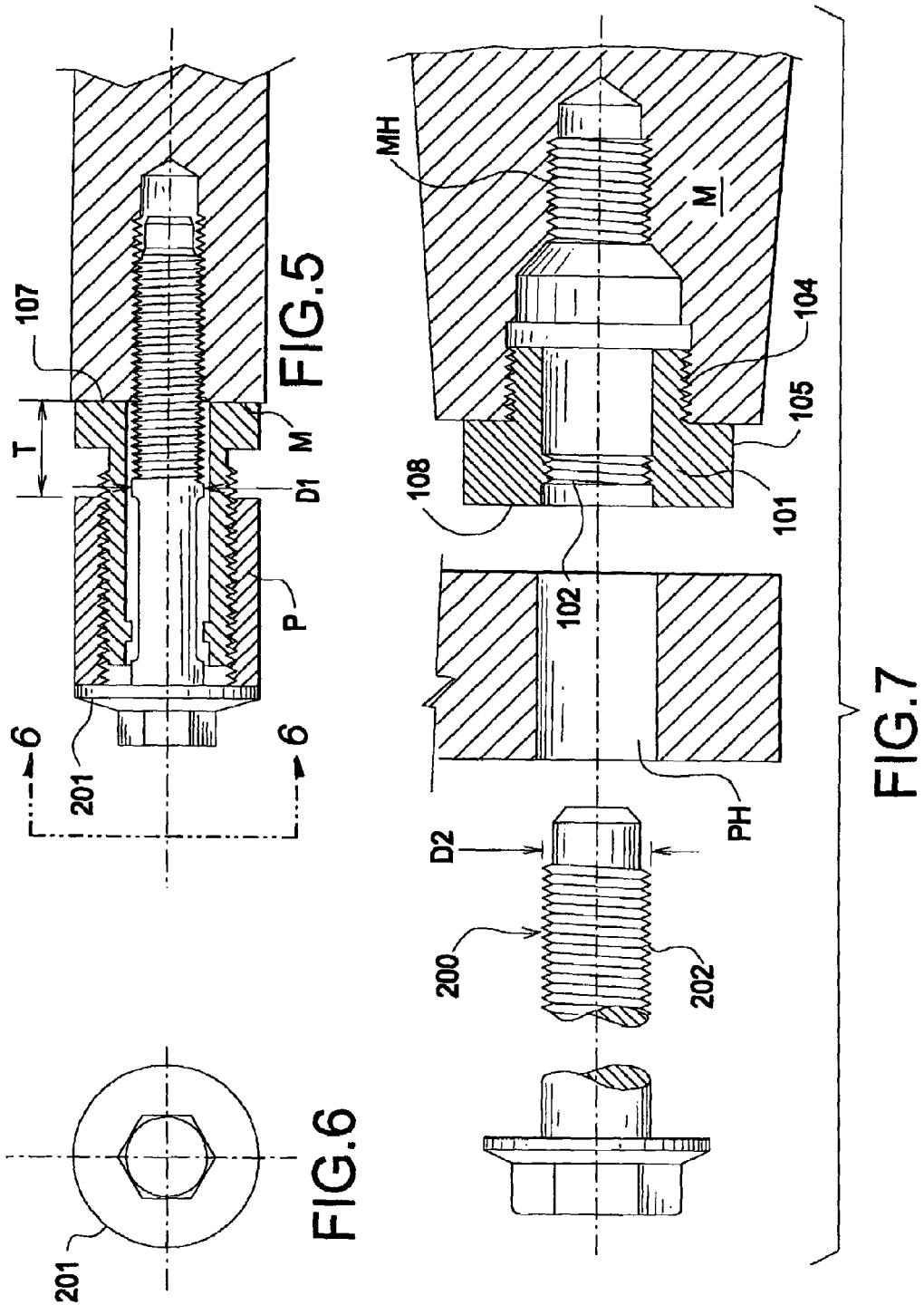

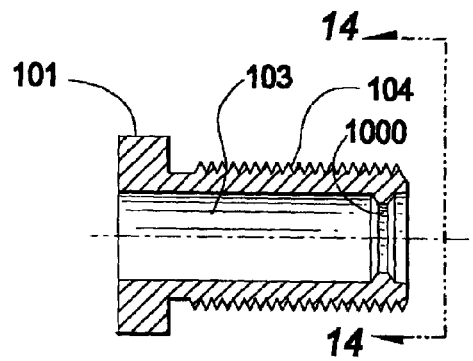
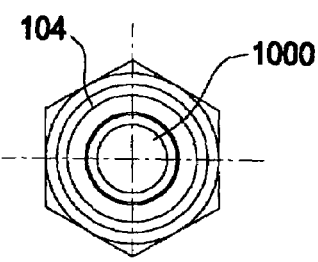
FIG.13  FIG.14
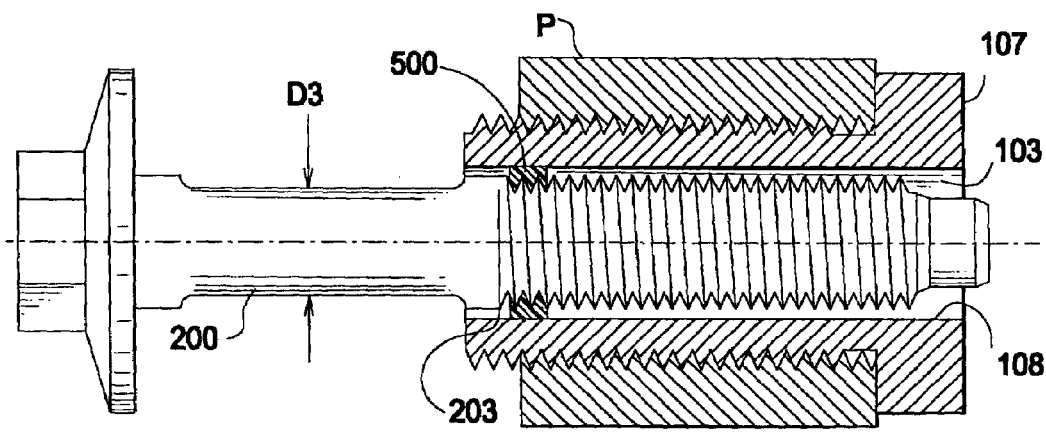
FIG.15
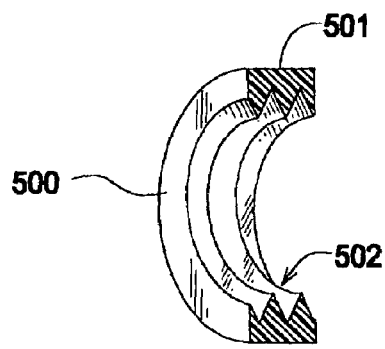
FIG.16

CONNECTOR

FIELD OF THE INVENTION

The invention relates to a connector, and more particularly, to a connector for connecting components while simultaneously compensating for a gap between the components.

BACKGROUND OF THE INVENTION

Equipment assembly may at times involve spaces or gaps between components, that is, dimensional differences between components at fastening points. This can be caused by design requirements, assembly clearances or stacked tolerances, for example. The gaps may be minimal or significant, on the order of many tens of millimeters.

Assembly of equipment components can be adversely affected by such gaps. Assembly of components with a gap or gaps between them is generally not consistent with proper operation of the equipment, or may generate undesirable loads, stresses or distortion as each gap is closed by bolt forces.

In order to eliminate such gaps it is necessary to either design and manufacture components accordingly, which can be time consuming and relatively expensive, in the alternative, use devices to accommodate the gap while providing structural integrity.

Representative of the art is U.S. Pat. No. 4,682,906 (1987) to Rückert et al. which discloses a device for the clamping connection of structural parts which are spaced apart from each other by means of a spacer disk arranged within said space and resting by its outer broad side against one structural part.

Also representative of the prior art is U.S. Pat. No. 5,501,122 to Leicht et al. which discloses a twin cone device for aligning holes in components to be joined. The device comprises a set of conical structures joined by a bolt.

Reference is also made to co-pending patent application Ser. No. 10/267,071 filed Oct. 7, 2002 which discloses a tolerance compensating mounting device.

The prior art does not solve the problem of compensating for a significant gap between components while simultaneously joining the components in a properly torqued manner using a connector having a jack-like action without inducing undesirable stresses in the components.

What is needed is a device that completely spans a gap between components to be joined using a threaded bushing cooperatively engaged with an adapter while simultaneously connecting the components. What is needed is a connector having a jack-like action that automatically compensates for a gap between mounting surfaces during installation. The present invention meets these needs.

SUMMARY OF THE INVENTION

The primary aspect of the invention is to provide an adapter connector that completely spans a gap between components to be joined using a threaded bushing cooperatively engaged with an adapter while simultaneously connecting the components.

Another aspect of the invention is to provide a connector having a jack-like action that automatically compensates for a gap between mounting surfaces during installation.

Other aspects of the invention will be pointed out or made obvious by the following description of the invention and the accompanying drawings.

A connector comprising an adapter having a threaded bore and a bushing having an external thread and an internal thread. The adapter has a stop on an outer surface to prevent rotation. The bushing is threaded into the adapter bore. A bolt is threaded into a bushing bore using the internal threads. As the bolt is turned the internal threads cause an interference fit between the bolt shank and the threads, temporarily preventing further insertion of the bolt. The bolt is then turned further causing the bushing to unscrew from the adapter toward the mounting surface until the bushing bears upon the mounting surface. The adapter engages with part thereby completely compensating for a gap between the part and a mounting surface. The adapter does not turn through engagement of the stop with an immoveable part. As the bolt is turned further, the sacrificial internal threads are stripped to allow the bolt to be fully torqued into a mounting surface hole.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a cross-section view of the tolerance compensating device.

FIG. 2 is a plan view at line 2—2 in FIG. 1.

FIG. 3 is a plan view at line 3—3 in FIG. 1.

FIG. 4 is a side cross-section view of the inventive device.

FIG. 5 is a side cross-section view of the inventive device.

FIG. 6 is a plan view at line 6—6 in FIG. 5.

FIG. 7 is a cross-section view of an alternate embodiment.

FIG. 13 is a side cross-section view of the alternate embodiment shown in FIG. 10.

FIG. 14 is a plan view at line 14—14 in FIG. 13.

FIG. 15 is a cross-sectional view of an alternate embodiment.

FIG. 16 is a perspective cross-sectional view of a collar used in the alternate embodiment in FIG. 15.

DETAILED DESCRIPTION OF THE PREFERRED EMBODIMENT

Figure 8:
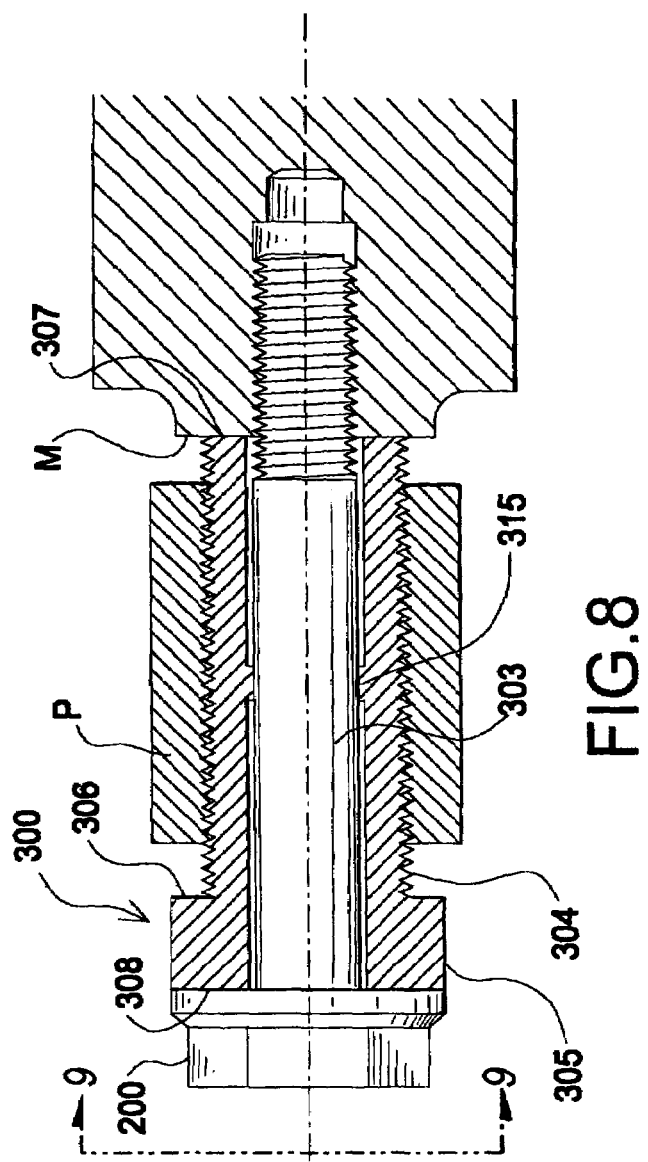
FIG. 8 depicts a third alternate embodiment of the invention.

FIG. 1 is a cross-section view of the tolerance compensating mounting device. The inventive device 100 comprises bushing 101. Bushing 101 is substantially cylindrical. Bushing 101 having a surface feature 102 comprising a thread. Surface feature 102 may comprise raised potions of the surface for engaging a fastener as described herein. In the preferred embodiment surface feature comprises thread 102.

Thread 102 comprises approximately two pitches of any thread form known in the art. Bushing 101 also comprises bore or hole 103 that runs the length of bushing 101 along a major axis. Bolt 200 engages bushing 101 through hole 103. Bolt 200, see FIG. 4, engages threads 102. A major diameter of threads 102 is less than a diameter of hole 103 such that threads 102 may engage a bolt without bolt 200 engaging a surface of hole 103.

Bushing 101 comprises a metallic material on the preferred embodiment. However, one can appreciate that it may also comprise a non-metallic material, for example a composite, ceramic or plastic, for use in situations where a non-conductive insulator is required between joined parts, or in the case where a low-torque application is required.

Bushing 101 also comprises an external surface having external threads 104. Threads 104 extend along a length L of an outer surface of bushing 101.

Bushing 101 further comprises symmetric flats 105 that are parallel to a major axis allowing use of a wrench or fingers to install the tool, see FIG. 2 and FIG. 3. The flats are of a shape similar to that of a nut or bolt head, known in the art. The flats may also be replaced with a knurled surface or plain cylinder surface to allow the bushing to be turned by hand, i.e., finger.

Referring to FIG. 4, the device 100, without bolt 200, is first threaded into part P. Threads 104 engage threads PT in part P. In the preferred embodiment, bushing 101 is threaded into the part P until surface 106 engages part P. One can appreciate that surface 106 need not actually touch part P, but engagement is a good indication that bushing 101 is fully inserted into part P. It is also preferable that bushing 101 partially extend length A beyond part P when it is fully inserted, assuring engagement of a maximum number of threads 104 with part P. Bolt 200 is then threaded into hole 103 until a bolt shank or an end of bolt threads 202 engage threads 102. A diameter D1 of the shank is greater than a minor diameter D2 of threads 202, see FIG. 7. This results in an interference fit between bolt 200 and threads 102, temporarily preventing further insertion of bolt 200 into bushing 101. A diameter D3 is less than the minor diameter D2. This is so that not only are clearances and tolerances compensated in the "Z" direction (along a bolt major axis), but also clearances and tolerances are compensated in the "X" and "Y" directions as well by disengaging threads 102 from the shank once the bolt has been inserted beyond a predetermined point.

Part P is then aligned with mounting surface M such that bolt 200 lines up with hole MH.

In an alternate embodiment an adhesive, such as Loctite 2015™, is applied to bolt threads 202. The adhesive is used to temporarily adhere bolt threads 202 to threads 102. In this embodiment, bushing 101 is first inserted into part P as described above. A portion of bolt threads 202 are coated with the adhesive. Bolt 200 is threaded into the bush and thereby into threads 102. The adhesive temporarily fastens the bolt threads 202 to bush threads 102. Bolt 200 is then turned which causes bushing 101 to turn as well. Bolt 200 is turned until surface 107 engages mounting surface M, at which point bushing 101 stops turning. The adhesive then fails in shear upon further application of torque to the bolt, whereby the bolt continues to turn until it is fully engaged with a hole MH.

Referring to FIG. 5, bolt 200 is then turned, which has the effect of unscrewing bushing 101 from part P due to the interference between the bolt 200 and threads 102. Bushing 101 is turned with bolt 200 until surface 107 engages mounting surface M. A further low torque is then applied to bolt 200 sufficient to distort, strip or destroy threads 102. One skilled in the art can appreciate from this description that threads 102 are relatively "soft" and as such are sacrificial in order to provide a means of turning bushing 101 with bolt 200 until the bushing seats against a mounting surface. A similar result could also be obtained by an adhesive, a short interference length or a polymeric insert, all in the hole 103 and all of which would temporarily grip the shank of the bolt allowing bushing 101 to be turned with bolt 200.

A further embodiment may comprise a variation of thread 102 where one thread is slightly distorted so that the thread is slightly "stiff" causing a frictional engagment with the bolt threads 202.

One can also appreciate that the threads on bolt 200 which engage threads 102 partially or fully deform or strip once bushing 101 is seated on the mounting surface, because the upper portion of the bolt threads are not expected to engage the threads in mouting hole MH.

In an alternate embodiment, diameter D1 of bolt 200, see FIG. 7, may extend only a limited distance up the shank from threads 202. As before, threads 102 are stripped by the wider portion of the shank. As the bolt is threaded into the mounting surface the reduced diameter portion of the bolt shank prevents a further torqued inducing engagement between the shank and the stripped threads 102. This prevents an errant torque from being registered as the bolt is fully torqued into the mounting surface.

The application of a torque to the bolt 200 to strip the threads 102 also has the effect of placing a preload on part P. This feature of the invention has the benefit of stiffening the part and overall assembly. The magnitude of the preload can be adjusted according to the torque required to strip threads 102.

Once bushing surface 107 engages mounting surface M, a torque is applied to the bolt, causing sacrificial threads 102 to fail. Bolt 200 is then fully threaded into threaded hole MH in mounting surface M until bolt flange 201 engages a bearing surface of part P. Bolt 200 may then be torqued to an appropriate torque value depending upon the application. As one can see, the tolerance gap has been automatically and completely spanned with the bushing.

FIG. 6 is a plan view of the fastener along line 6—6 in FIG. 5. Flange 201 is shown. Flange 201 may be of any width desired by a user.

As can be seen in FIG. 4 and FIG. 5, a significant tolerance T can be spanned using the inventive device while simultaneously mounting a fixture to a mounting surface. The device allows a firm, properly torqued bolted joint to be realized without putting undesirable bending (or other distorting loads) into the clamped component or fixture.

The inventive tool can be used to eliminate the effect of tolerance stacks (or, indeed, to allow the use of wide tolerances) in a number of instances, for example, in the case where a large clearance is needed to allow easy assembly of a component while fully compensating for the tolerance. The inventive device can also be used to compensate for tolerances when bolting between faces in different planes as well as bolting to faces at odd angles to a primary surface mounting surface.

Also note that the inventive device can be "inverted" in an alternate embodiment. FIG. 7 is a cross-section view of an alternate embodiment. Instead of being screwed into the part to be bolted down, it is instead screwed into the mounting surface hole using threads 104. In this case external threads 104 are left-handed. As an alternative, a frictional fitting, not shown but put in place of threads 102, is inserted into hole 103 to frictionally grip bolt 200 so that as the bolt is turned, the bushing unscrews or backs-out of the mouting surface to take up the tolerance clearance until the bushing engages the part. The frictional fitting embodiment imparts a minimal torque requiremnt which is easily realised as the bolt is further torqued into the mounting surface once the bushing is seated.

Once bushing 101 and part P are seated against surface 108, threads 102 are stripped as described above and bolt 200 is then completely torqued down.

In yet another alternate embodiment, threads 102 extend along the length of bore 103 and are not sacrificial. Threads 102 are the opposite hand from the threads 104. In this embodiment, bushing 101 is first threaded into mounting hole MH using left-hand threads 104. Bolt 200 is then inserted through a hole PH in part P and into bore 103. In this embodiment, part P has no threads in the hole, nor does bolt 200 threadably engage the mounting surface hole. As the bushing 101 is unscrewed from the mounting surface M by turning action of bolt 200, bushing surface 108 comes into engagement with part P. Bolt 200 is then fully screwed into bushing 101. The left-hand thread 104 engages mouting hole MH while bolt 200 is fully torqued in place. One can appreciate that it is desireable that a minimum number of full threads engage the hole MH to develop the full strength of the connection, as known in the art of threaded connections.

One skilled in the art can also appreciate that the bushing 101 can be rotated by hand or by means of a tool or wrench using flats 105, either for installing it into a part or turning it to compensate for a tolerance clearance T.

FIG. 8 depicts a third alternate embodiment of the invention. Bushing 300 comprises a substantially cylindrical shape having a bore or hole 303 running along a major axis of bushing 300. External threads 304 extend along an outside surface of bushing 300. In this embodiment, threads 304 are right-handed. Flats or knurled surface 305 provided for manually engaging or threading the bushing comprise one end of the device. Bolt 200 engages the bushing through the hole 303. In use, component P is placed in its substantially final assembled position relative the mounting surface M. Bushing 300, with bolt 200 inserted in hole 303, is then threaded into component P using threads 315 until surface 307 engages mounting surface M. Bushing 300 may be turned manually, or, by sacrificial threads 315, or other frictional insert to engage bolt 200 thereby allowing bolt 200 to turn bushing 300 as described for the other embodiments. Once bushing surface 307 engages mounting surface M, threads 315 are stripped by further turning of bolt 200 and bolt 200 is then fully threaded into mounting surface M. Bolt 200 is fully torqued once a head of bolt 200 is fully engaged with bushing surface 308.

Alternatively, bushing 300 can be assembled into component P and rotated until surface 307 contacts surface M. Bolt 200 is then assembled via a 'clear' hole 303.

Figure 9:
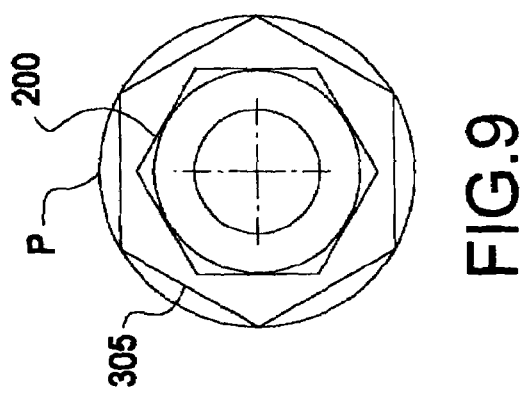
FIG. 9 is a plan view along line 9—9 in FIG. 8.

FIG. 9 is a plan view along line 9—9 in FIG. 8. Flats 305 for engaging a tool or the like are shown.

Figure 10:
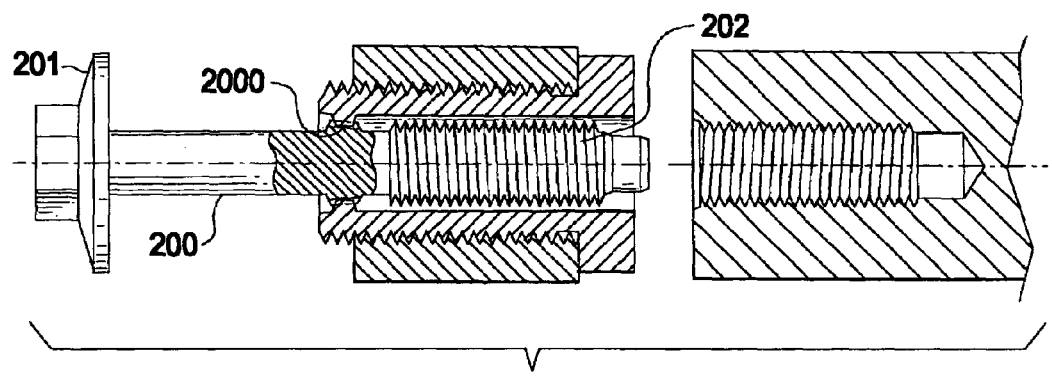
FIG. 10 is a side cross-section view of an alternate embodiment.

FIG. 10 is a side cross-section view of an alternate embodiment. Bushing 101 and bolt 200 are as described in the foregoing figures with the exception of the following. Bolt 200 comprises one or more radially projecting splines 2000. Splines 2000 have an outer diameter that is greater than an outer diameter of threads 202.

Figure 11:
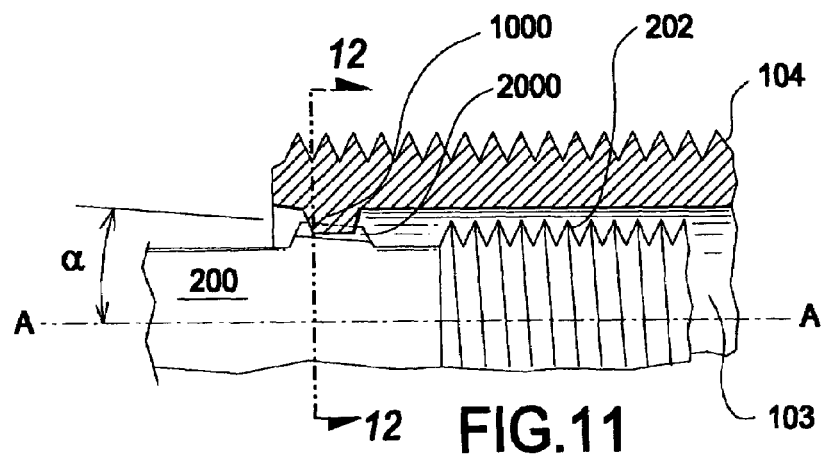
FIG. 11 is a detail of FIG. 10.

FIG. 11 is a detail of FIG. 10. Bushing 101 comprises shoulder 1000 which is disposed on an inner surface of hole 103. Shoulder 1000 has an inner diameter which is less than an outer diameter of splines 2000.

In use, once bushing 101 is inserted in to part P, bolt 200 is pressed into hole 103 until splines 2000 come into contact with shoulder 1000. Bolt 200 is further pressed axially into hole 103 with sufficient force to cause splines 2000 to partially cut into shoulder 1000. Once splines 2000 are engaged with shoulder 1000 in this manner, bushing 101 is turned by turning bolt 200. Bushing 101 stops turning when surface 107 engages M. As further torque is applied to bolt 200, splines 2000 shear off thereby allowing bolt 200 to be fully threaded into M, and thereby fully engage P as shown in FIG. 5.

Splines 2000 have a somewhat conical form, being disposed at an angle $\alpha$ to a bolt centerline A—A. Angle $\alpha$ allows splines 2000 to progressively engage shoulder 1000 up to a predetermined point without allowing splines 2000 to be driven completely past shoulder 1000 upon the initial engagement described in FIG. 10.

An outer diameter of threads 202 is less than an inner diameter of shoulder 1000 in order to prevent threads 202 from coming in contact with shoulder 1000 during insertion of bolt 200. This also provides enhanced X–Y movement flexibility of bolt 200 to thereby enhance an alignment characteristic with hole MH.

Figure 12:
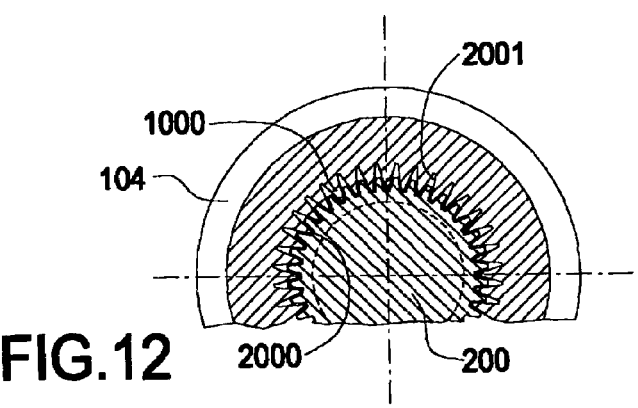
FIG. 12 is a section view at line 12—12 in FIG. 11.

FIG. 12 is a section view at line 12—12 in FIG. 11. Splines 2000 are shown radially projecting from bolt 200, toward and engaged with shoulder 1000. In an alternate embodiment, slots to receive splines 2000 may be precut into shoulder 1000.

FIG. 13 is a side cross-section view of the alternate embodiment shown in FIG. 10. Shoulder 1000 is shown extending from an inner surface of bore 103. Shoulder 1000 may extend over only a portion of the inner surface with equally good results. The engagement between shoulder 1000 and spline or splines 2000 need only be sufficient for bolt 200 to transmit torque to bushing 101 sufficient to overcome a turning friction of bushing 101 in part P.

FIG. 14 is a plan view at line 14—14 in FIG. 13.

FIG. 15 is a cross-sectional view of an alternate embodiment. Collar 500 is engaged with and between bolt threads 202 and bushing bore inner surface 108. Collar 500 comprises outer surface 501 and threads 502. Threads 502 may be precut or may be cut by action of threads 202. Collar 500 has a torous form.

In use, collar 500 is turned or threaded onto threads 202, which may include contact with shank edge 203. Contact with shank edge 203 limits any further travel of collar 500 up the bolt. Bolt 200 with collar 500 is then inserted into bore 103. An outside diameter of collar 500 is equal to or slightly greater than an inside diameter of bore 103 in order to create a frictional engagement between outer surface 501 of collar 500 and the inside surface 108 of bushing 101. As bolt 200 is turned into hole MH the frictional engagement of collar outer surface 501 with the inner surface 108 of bushing 101 causes bushing 101 to turn. As bushing 101 turns, bushing 101 moves axially resulting in surface 107 coming into contact with mounting surface M. Bushing 100 then stops turning as surface M prevents further axial movement. Once bushing 101 engages mounting surface M, collar 500 simply slides along inner surface 108. The sense or direction of threads 104 is the same as for threads 202. Threads 104 and 202 may either be right-handed or left-handed.

Collar 500 may comprise any material which can be cut by threads 202 and have a sufficient coefficient of friction on outer surface 501 to cause bushing 101 to turn upon a rotation of bolt 200. Collar 500 may comprise a plastic material, such as nylon, or any equivalent thereof.

Collar 500 may also comprise an inside diameter sufficiently small so as to create a frictional fit between collar 500 and bolt threads 202. A frictional fit is also present between outer surface 501 and inner surface 108 as described above. Such a frictional fit between the collar and the bolt threads does not require collar 500 to engage a shank edge 203 in order to cause bushing 101 to turn upon a rotation of bolt 200.

FIG. 16 is a perspective cross-sectional view of a collar used in the alternate embodiment in FIG. 15. Collar 500 is shown having threads 502 cut therein after engaging bolt threads 202. As previously described, threads 502 may be precut as well. Outer surface 501 frictionally engages an inner surface 108 of bushing 101.

Figure 17:
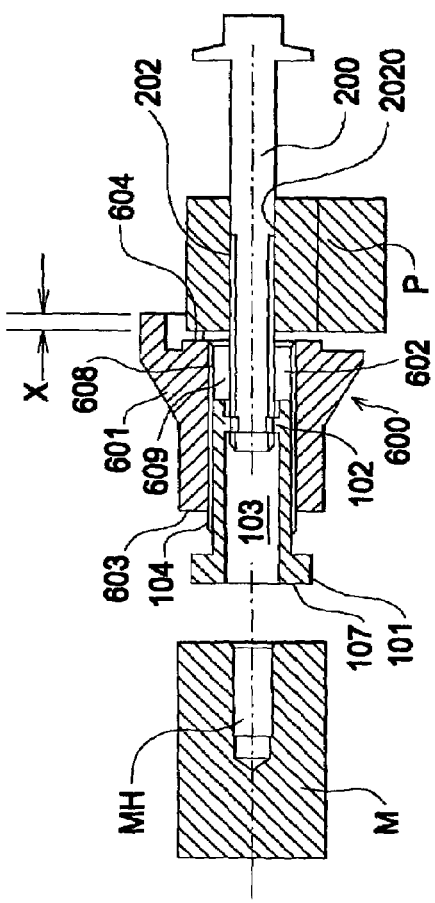
FIG. 17 is a cross-sectional side view of the connector.

FIG. 17 is a cross-sectional side view of a connector. The connector comprises a first body adapter 600 and second body bushing 101. Bushing 101 is shown threadably engaged with adapter 600. Bushing 101 comprises a bore 103 and threaded surface threads 104 as more fully described in FIG. 1.

Adapter 600 comprises body 601 having a bore 602. Bore 602 comprises threaded portion 608 on an inner surface 609. Bore 602 is of a diameter appropriate to engage bushing 101. Threads 608 cooperatively engage threads 104. Threads 104 and 608 may be either left hand or right hand. Bore 103 is coaxial with bore 602.

Figure 18:
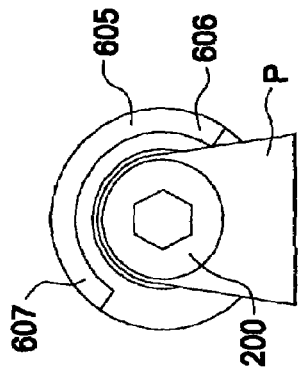
FIG. 18 is an end view of the connector.

Adapter 600 also comprises stop 605, see FIG. 18. Stop 605 has a substantially annular form in this embodiment, although a projecting tab or tabs will work as well, see FIG. 22. Stop 605 extends partially about an outer circumference of body 601. Stop 605 has ends 606 and 607. Ends 606 and 607 engage part P to prevent a rotation of adapter 600 when fastener 200 is being engaged and turned. Stop 605 partially overlaps part P by an amount (X) in order to assure proper engagement with either ends 606, 607 with part P when in use.

Fastener 200 actuates the connector and clamps part P to mounting M. Fastener 200 simultaneously engages part P, and bushing 101. Fastener 200 in this embodiment comprises a threaded bolt known in the art having a shank portion. The bolt is of a grade sufficient for the service.

In use, bushing 101 is threaded into adapter 600. The connector is then disposed adjacent part P. Bolt 200 is inserted through part P and engaged with a surface feature, namely, threads 102 in bushing 101. The hole in P through which bolt 200 is inserted is not threaded. Threads 102 must have the same handedness as threads 104 and 608. Bolt 200 is then threaded into bushing 101 until adapter 600 is engaged with part P by surface 604. Bolt 200 is further threaded into bore 103 until a bolt shank or an end of bolt threads 2020 come into contact with threads 102. A diameter D1 of the shank is greater than a diameter D2 of threads 202, see FIG. 7. This results in an interference fit between 2020 and threads 102, temporarily preventing further insertion of bolt 200 into bushing 101.

Part P with the adapter connector attached is then aligned with mounting surface M such that bolt 200 lines up with threaded hole MH. Bolt 200 is then turned and due to the interference between shank 2020 and threads 102, bushing 101 turns within adapter 600. Due to the engagement of stop 606 or 607 with P, adapter 600 does not appreciably rotate with respect to P. Therefore, as bushing 101 is turned with bolt 200, bushing 101 turns and moves axially toward mounting surface M through adapter 600. The cooperative action of bushing 101 turning within adapter 600 causes the adapter and bushing to axially extend until they extend fully across a gap between P and M. Further, the thrust effect caused by the axial movement of the bushing within the adapter keeps planar surface 604 engaged with P and therefore stop 606 or 607 engaged with P as well.

Bolt 200 is turned until surface 107 engages M. Additional torque is then applied to bolt 200 in order to strip threads 102. Threads 102 comprise only a minimal number in order to realize the sacrificial aspect of their use. Threads 102 may also comprise a protrusion within the bore sufficient to engage the bolt shank to cause rotation of the bushing without destroying the bolt threads 202.

Upon further turning, bolt 200 engages the threads in mounting hole MH. Bolt 200 is run down into MH until the bushing and adapter are fully engaged between P and M. Bolt 200 is then torqued as required in order to provide the desired clamping force to connect part P to M. One can appreciate that the maximum stress and separating force placed upon the part P is minimal since it is a function of the force acting to separate the bushing from the adapter. This, in turn, is a function of the torque applied to the bushing by action of the stripped threads 102. The force only need be that required to snugly seat the bushing and adapter against P and M.

In an exemplary assembly process, the bushing and adapter combination are preferably first connected to part P with the bolt as described in order to make the connector an integral portion of the part. Then as a single step during assembly of the part P to M, part P and the adapter connector are aligned with the hole MH and the bolt is quickly run down to effect final assembly. This process can be performed for a plurality of connectors in a timely manner to achieve rapid equipment assembly. Depending upon the need, the inventive connector can span a gap of up to or greater than approximately 10 centimeters.

FIG. 18 is an end view of the connector. Annular stop 605 is shown with ends 607, 606. Ends 607, 606 may comprise projecting members or tabs extending from body 601 as they are only necessary to stop or prevent a rotation of body 601 with respect to part P, see FIGS. 22 and 23.

Figure 19:
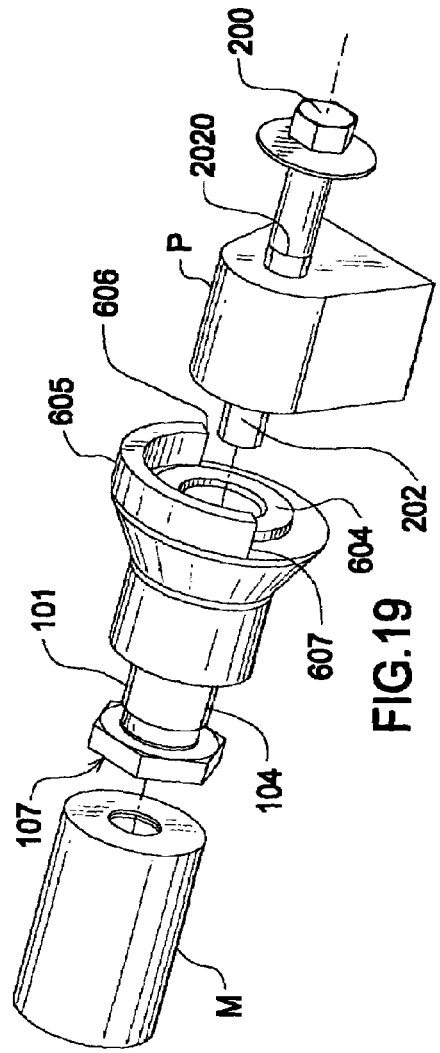
FIG. 19 is an exploded view of the connector.

FIG. 19 is an exploded view of the connector. In order to enhance assembly of parts using the adapter connector, the form or shape of stop 605 can be made to mimic or match a receiving portion on part P. This reduces or eliminates any looseness or movement of the adapter connector with respect to the part prior to final assembly. This also serves to "stiffen" the adapter connector combination on the part so that alignment of bolt 200 during assembly to MH occurs more accurately and repeatably. This in turn allows the final assembly process of P to M to proceed more rapidly.

Further, the threaded, coaxial relationship of the bushing and adapter reduces the overall diameter of the device as well as adding strength to the combination. This is particularly important since the connector becomes an integral part of the equipment. The connector must be capable of resisting lateral loads as well as fixing the relationship between P and M. Hence planar surfaces 107 and 604 enhance performance of the inventive connector over other prior art devices where the engaging surfaces may be arcuate or subject to a bending moment. The combined effect of the threaded, coaxial structure of the connector with the engagement surfaces provides a high strength, reliable means of connecting two components across a gap.

Figure 20:
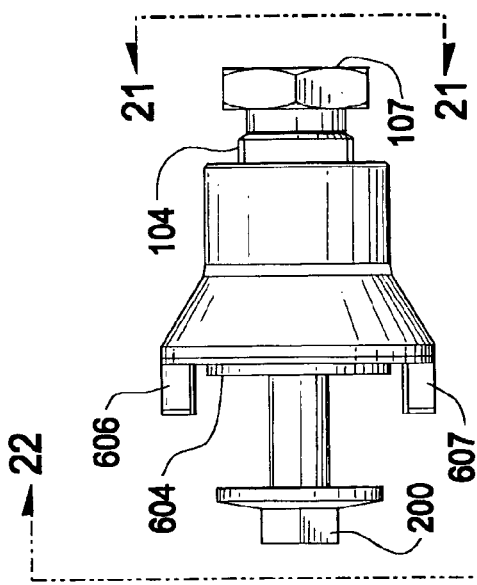
FIG. 20 is a side view of an alternate embodiment of the connector.

FIG. 20 is a side view of an alternate embodiment of the connector. Ends 606 and 607 comprise tabs that extend from body 601.

Figure 21:
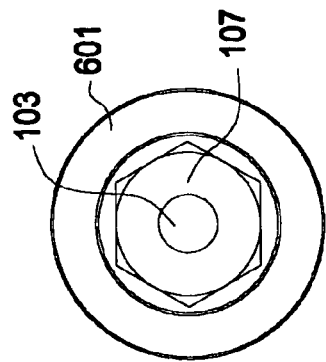
FIG. 21 is an end view of an alternate embodiment of the connector.

FIG. 21 is an end view of an alternate embodiment of the connector depicted in FIG. 20.

Figure 22:
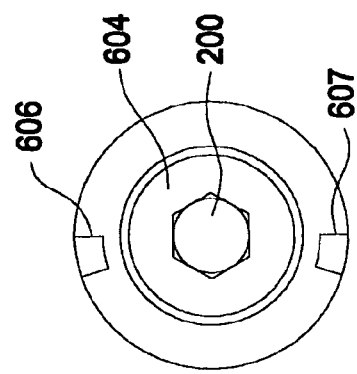
FIG. 22 is an end view of an alternate embodiment of the connector.

FIG. 22 is an end view of an alternate embodiment of the connector. Ends 606 and 607 may be disposed in any circumferential or radial position as may be required to effect proper engagement with P. Further, only a single end 606 may be used, or, three or more may used.

Figure 23:
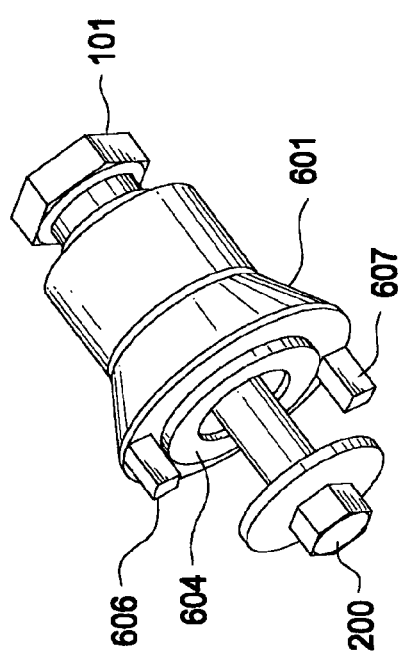
FIG. 23 is a perspective view of an alternate embodiment.

FIG. 23 is a perspective view of an alternate embodiment. Ends or tabs 606 and 606 are shown projecting from body 601.

Figure 24:
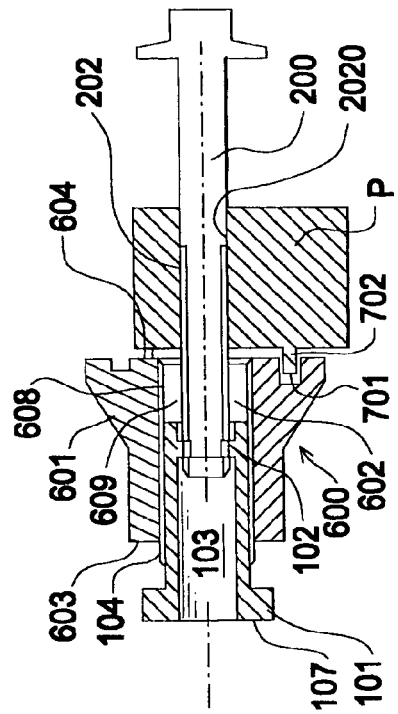
FIG. 24 is a cross-sectional view of an alternate embodiment.

FIG. 24 is a cross-sectional view of an alternate embodiment. Detent 701 in body 601 receives a tab 702. The combination of detent 701 and tab 702 serves the same function as tabs 607, 606, namely, to prevent a rotation of adapter 600 with respect to part P as bolt 200 is being threaded into bushing 101 and as bush 101 is rotated into engagement with M.

Although forms of the invention have been described herein, it will be obvious to those skilled in the art that variations may be made in the construction and relation of parts without departing from the spirit and scope described herein.

I claim:

1. A connector for connecting structurally spaced parts comprising:
   a first body having a threaded portion, a first bearing surface for engaging a structural part and having a member comprising a stop having a substantially annular form that extends partially about an outer circumference of the first body such that the stop partially overlaps the structural part for preventing a first body rotation with respect to the structural part;
   a second body having a second bearing surface for engaging an other structural part and having a threaded surface and further having a bore for receiving a fastener;
   the threaded surface engageable with the first body threaded portion; and
   the bore having a surface feature having a diameter less than an bore inside diameter, the surface feature engageable with the fastener so that turning the fastener determines an axial position of the second body with respect to the first body.

2. The connector as in claim 1, wherein:
   the fastener comprises a threaded fastener.

3. The connector as in claim 2, wherein the surface feature comprises a sacrificial thread having a diameter sufficient to cause an interference engagement with a fastener portion.

4. The connector as in claim 3, wherein:
   the threaded surface having the same handedness as the sacrificial thread.

5. The connector as in claim 1, wherein the second body further comprises symmetrically arranged engagement surfaces parallel to a major axis for turning the second body.

6. The connector as in claim 1, wherein:
   the threaded surface comprises left-band threads.

7. A connector for connecting spaced parts comprising:
   a body having a helically threaded bore surface and a stop having a substantially annular form that extends partially about an outer circumference of the body such that the stop partially overlaps a spaced part to prevent a rotation of the body;
   a bushing having a threaded surface, the threaded surface engageable with the helically threaded bore surface;
   the bushing having a bushing bore surface portion sacrificially engageable with a fastener portion; and
   upon engagement of the bushing bore surface portion with the fastener portion a rotation of the fastener causes a corresponding rotation of the bushing with respect to the body to determine an axial position of the bushing.

8. The connector as in claim 7 further comprising:
   at least two cooperating surfaces disposed on the bushing for engaging a tool by which the bushing is rotated.

9. The connector as in claim 7 further comprising:
   a planar bushing surface for engaging a mounting surface; and
   a planar body surface for engaging an other part surface.

10. The connector as in claim 7, wherein the means for engaging a part comprises a detent.

11. The connector as in claim 7, wherein the stop further comprises a projecting member.

* * * * *